United States Patent
Bruning

(10) Patent No.: US 7,521,872 B2
(45) Date of Patent: Apr. 21, 2009

(54) INTEGRATED LAMP WITH FEEDBACK AND WIRELESS CONTROL

(75) Inventor: Gert W. Bruning, Sleepy Hollow, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 155 days.

(21) Appl. No.: 10/570,866

(22) PCT Filed: Sep. 7, 2004

(86) PCT No.: PCT/IB2004/051700

§ 371 (c)(1),
(2), (4) Date: Mar. 7, 2006

(87) PCT Pub. No.: WO2005/024898

PCT Pub. Date: Mar. 17, 2005

(65) Prior Publication Data

US 2007/0007898 A1 Jan. 11, 2007

Related U.S. Application Data

(60) Provisional application No. 60/501,528, filed on Sep. 9, 2003.

(51) Int. Cl.
*H05B 37/02* (2006.01)
*F21V 29/00* (2006.01)

(52) U.S. Cl. .............. 315/158; 315/149; 315/309; 315/312; 315/185 S; 362/294; 362/296; 362/547; 362/545

(58) Field of Classification Search ......... 315/149–159, 315/291–296, 307–311, 312–325, 185 S; 362/543–549, 294, 257

See application file for complete search history.

(56) References Cited

U.S. PATENT DOCUMENTS 5,254,908 A 10/1993 Alt et al.

(Continued)

FOREIGN PATENT DOCUMENTS

DE 40 01 811 A1 8/1991

(Continued)

OTHER PUBLICATIONS

U.S. Appl. No. 60/458,538, "Single Driver For Multiple Light Emitting Diodes", filed May 7, 2003.

(Continued)

*Primary Examiner*—Tuyet Vo

(57) ABSTRACT

A lamp assembly (50) employs a reflector (52) defining a light reflecting area (53), and a heat sink (54) defining a circuit housing area (55). A LED assembly (51) is disposed within the light reflecting area (53) and heat sink (54) dissipates heat away from LED assembly (51). One or more LEDs of LED assembly (51) emit a light in response to a flow of a LED current through the LEDs. One or more optical power sensors of LED assembly (51) sense an emission of the light by LED(s). A LED driver circuit (30) is disposed within the circuit housing area (55) to control the flow of the LED current through the LED(s) as a function of a sensing of the emission of the light by the optical power sensor(s) and a desired level of one or more lighting variables associated with the LED(s).

13 Claims, 3 Drawing Sheets

U.S. PATENT DOCUMENTS

| | | | |
|---|---|---|---|
| 5,471,052 A * | 11/1995 | Ryczek | 250/226 |
| 5,585,697 A * | 12/1996 | Cote et al. | 315/157 |
| 5,909,087 A | 6/1999 | Bryde et al. | |
| 6,095,661 A | 8/2000 | Lebens et al. | |
| 6,114,812 A | 9/2000 | Lee | |
| 6,149,283 A | 11/2000 | Conway et al. | |
| 6,271,815 B1 | 8/2001 | Yang et al. | |
| 6,404,409 B1 | 6/2002 | Solomon | |
| 6,426,704 B1 * | 7/2002 | Hutchison | 340/693.5 |
| 6,445,139 B1 * | 9/2002 | Marshall et al. | 315/291 |
| 6,498,440 B2 * | 12/2002 | Stam et al. | 315/291 |
| 7,228,102 B2 * | 6/2007 | Gordon | 455/19 |
| 7,347,589 B2 * | 3/2008 | Ge | 362/294 |
| 2001/0024112 A1 | 9/2001 | Jacobs et al. | |
| 2002/0075158 A1 | 6/2002 | Hooks et al. | |
| 2002/0145394 A1 | 10/2002 | Morgan et al. | |
| 2002/0153851 A1 | 10/2002 | Morgan et al. | |
| 2002/0190972 A1 * | 12/2002 | Ven de Van | 345/204 |
| 2003/0018734 A1 | 1/2003 | Luo et al. | |
| 2003/0085749 A1 | 5/2003 | Xu et al. | |
| 2004/0037088 A1 * | 2/2004 | English et al. | 362/545 |
| 2005/0007772 A1 * | 1/2005 | Yen | 362/206 |
| 2006/0239013 A1 * | 10/2006 | Olsson et al. | 362/362 |
| 2007/0217188 A1 * | 9/2007 | Klipstein et al. | 362/157 |

FOREIGN PATENT DOCUMENTS

| | | |
|---|---|---|
| DE | 40 14 054 A1 | 11/1991 |
| EP | 1 439 120 A2 | 7/2004 |
| JP | 2003257678 | 9/2003 |
| WO | WO 93/23977 A1 | 11/1991 |
| WO | WO 03/026358 A1 | 3/2003 |

OTHER PUBLICATIONS

U.S. Appl. No. 60/468,553, "Current control Method and C ircuit for Light Emitting Diodes", filed May 7, 2003.

U.S. Appl. No. 10/323,445, "Supply Assembly for a LED Lighting Module", filed Dec. 19, 2002.

* cited by examiner

INTEGRATED LAMP WITH FEEDBACK AND WIRELESS CONTROL

CROSS REFERENCE TO RELATED APPLICATION

This application claims the benefit of U.S. provisional application Ser. No. 60/501,528, filed Sep. 9, 2003, which the entire subject matter is incorporated herein by reference.

The present invention relates to light emitting diodes (LEDs) and optical power sensors integrated in a lamp housing. More specifically, the present invention relates to LEDs and optical power sensors integrated in a lamp housing with the lamp driver circuits to provide feedback and remote control of the lamp.

Most artificial light is produced by an electric discharge through a gas in a lamp. One such lamp is the fluorescent lamp. Another method of creating artificial light includes the use of a LED, which provides a spectral output in the form of a radiant flux that is proportional to a forward current flowing through the LED. Additionally, a LED light source can be used for generation of a multi-spectral light output.

Conventional LED light sources utilize individual encapsulated light emitting diodes or groups of light emitting diodes of substantially similar spectral characteristics encapsulated as a unit. Conventional LED light sources are implemented as color corrected LED light sources. Color corrected LED light sources are manufactured by applying a phosphor compound layer to a LED, either directly or within an encapsulent. The phosphor layer absorbs the light emitted by the LED or a portion of the light emitted by the LED and emits light based on an interaction of the absorbed light and the phosphor compound. The color corrected LED light sources are grouped together to form the LED light source. Color corrected LEDs realize maximum accuracy in spectral output when a specified amount of direct current is applied to the color corrected LEDs. The specified amount of direct current, among other data, is included in a rating for each color corrected LED.

Combining the output of multiple colored LEDs in a lamp is an alternate way to form a white light source. Such combinations offer the option of producing a variety of colors. It is a difficult problem to combine and maintain correct proportions of light from multi-colored LEDs to create light that is of desired color and intensity as well as reasonable spatial uniformity, because LED spectra and efficiencies change with current, temperature and time. In addition, LED properties vary from LED to LED, even from a single manufacturing batch. As LED manufacturing improves with time, LED-to-LED variations may become smaller, but LED variations with temperature, current, and time are fundamental to the semiconductor devices. Conventional control systems, in some embodiments, adjust intensity levels of spectral output by increasing or decreasing the number of LEDs receiving the specified amount of direct current.

It is desirable to have an integrated lamp with a feedback mechanism to ensure the desired lamp illumination characteristics wherein illumination sensors, LEDs and control circuitry are integrated within a lamp housing which is operable to reflect a portion of emitted light back to the photosensors for system feedback. It is also desirable that the controlled illumination characteristics include emitted intensity and color, which may vary as a function of time as indicated by input received from a remote radio frequency source.

One form of the present invention is a lamp assembly comprising a reflector, a heat sink, a LED assembly and a LED driver circuit. The reflector defines a light reflecting area. The heat sink defines a circuit housing area. The LED assembly is disposed within the light reflecting area and in thermal communication with the heat sink to dissipate heat away from the LED assembly. The LED assembly includes one or more LEDs operable to emit a light in response to a flow of a LED current through the LED assembly. The LED assembly also includes one or more optical power sensors operable to sense an emission of the light by the LED(s). The LED driver circuit is disposed within the circuit housing area, and is in electrical communication with the LED assembly to control the flow of the LED current through the LED(s) as a function of a sensing of the emission of the light by the optical power sensor(s).

The term "thermal communication" is defined herein as a physical connection, a physical coupling, or any other technique for thermally transferring heat from one device to another device.

The term "electrical communication" is defined herein as an electrical connection, an electrical coupling or any other technique for electrically applying an output of one device to an input of another device.

The foregoing form as well as other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

Figure 1:
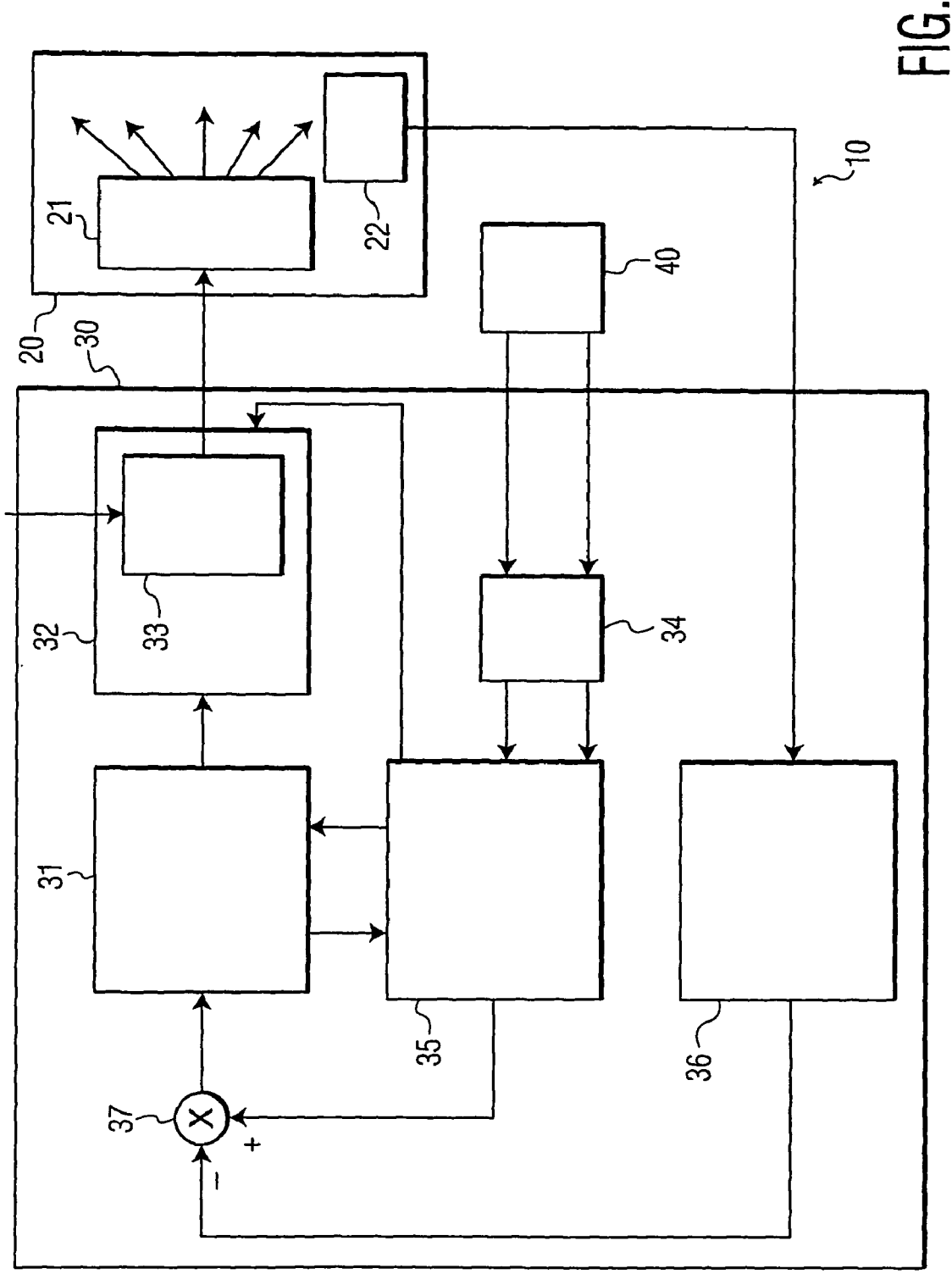
FIG. 1 illustrates one embodiment of a LED system in accordance with the present invention.

A light emitting diode system 10 illustrated in FIG. 1 employs a LED assembly 20, a LED driver assembly 30, and a remote controller 40. LED assembly 20 includes one or more light emitting diodes ("LEDs") 21 with each LED being arranged individually or in an array, and one or more optical power sensors ("OPSNR") 22. LED driver assembly 30 includes a controller ("CONT") 31, a power circuit ("PWRC") 32, an antenna 34, a transceiver ("TX/RX") 35, a signal processor ("SP") 36, and an error detector 37.

Optical power sensors 22 sense any emission of light from LEDs 21. In one embodiment, optical power sensors 22 are a plurality of photosensors where each photosensor is responsive to a different specific range of wavelengths. In a second embodiment, optical power sensors 22 are arranged in groups of photosensors where each photosensor group is responsive to a different specific range of wavelengths. In a third embodiment, optical power sensors 22 are a plurality of photosensors where each photosensor is responsive to the same range of wavelengths.

Optical power sensors 22 electrically communicate one or more sensing signals SEN indicative of a sensing an emission of light from LEDs 21. In one embodiment, optical power sensors output current signals indicative of the sensing of the emission of light from LEDs 21, and an operational amplifier (not shown) converts the current signals into voltage signals, and electrically communicates the voltage signals to signal processor 36.

Figure 2:
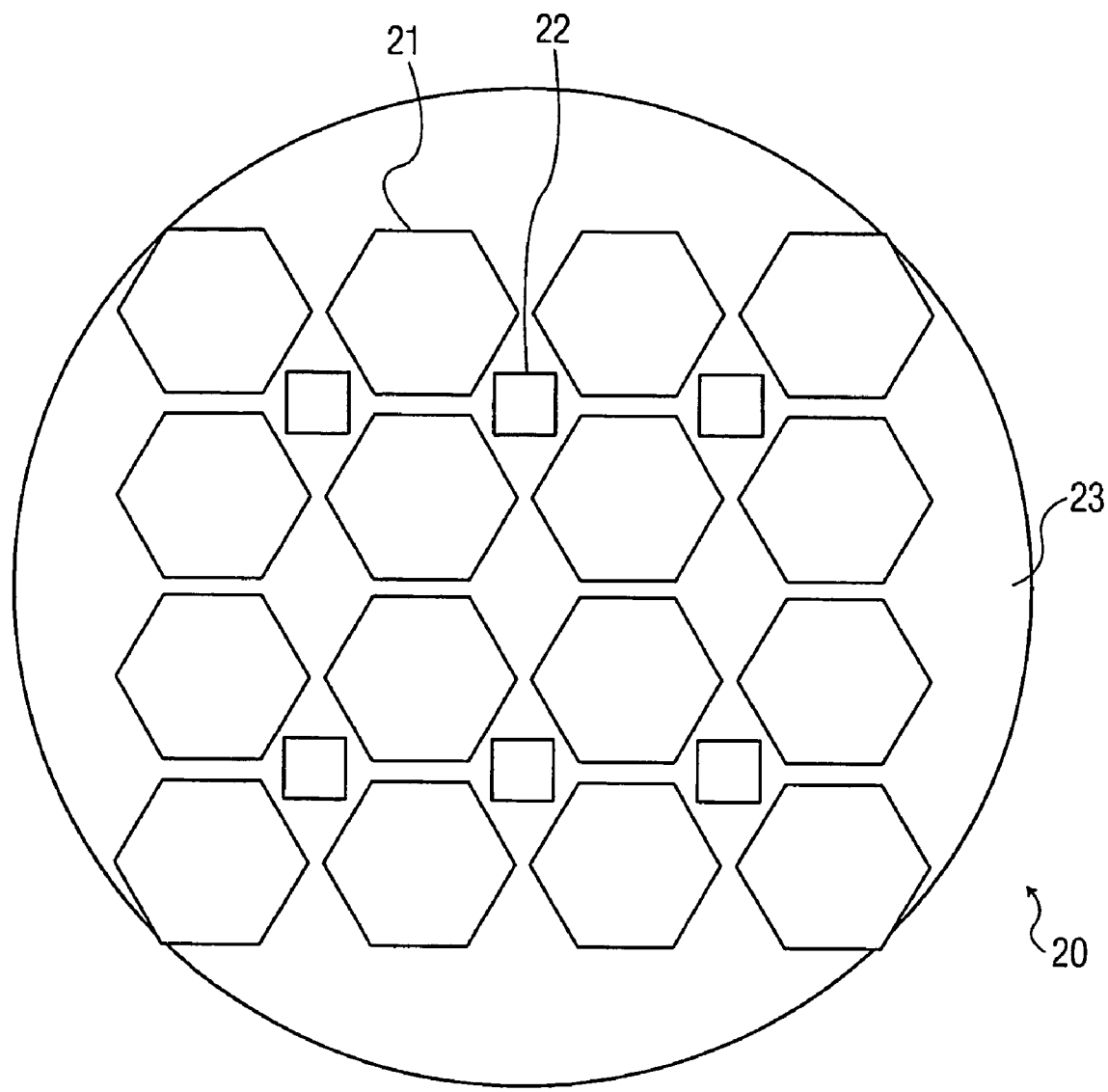
FIG. 2 illustrates one embodiment of a LED assembly in accordance with the present invention.

In practice, the structural construction of LED assembly 20 is dependent upon commercial implementations of LED assembly 20. FIG. 2 illustrates one structural construction of light emitting diode (LED) assembly 20 (FIG. 1) employing LEDs 21 and optical power sensors 22 formed on or attached to a substrate 23. In this embodiment, the LEDs 21 consist of rows of LED arrays, specifically, a row of red LED arrays $LA_R$, a row of green LED arrays $LA_G$, a row of blue LED arrays LAB and a row of amber LED arrays $LA_A$. Optical power sensors 22 consist of photo sensors ("PS") placed between neighboring LED arrays.

Referring again to FIG. 1, signal processor 36 determines a sensed light value SLV indicative of the sensing of the emission of light from LEDs 21, and electrically communicates the sensed light value SLV to error detector 37. In one embodiment, error detector 37 is an adder, as shown, and signal processor 36 electrically communicates sensed light value SLV to a negative input of the adder. In a second embodiment, error detector 37 is an operation amplifier with a dual input, and signal processor 36 electrically communicates sensed light value SLV to an inverting input of the operational amplifier.

A user of LED system 10 can operate remote controller 40 to transmit a control signal CS1 to antenna 34 where control signal CS1 is indicative of a desired emission of light from LEDs 21. Antenna 34 electrically communicates control signal CS1 to transceiver 35, which selectively converts control signal CS1 into a desired lighting value DLV indicative of the desired emission of light from LEDs 21, and electrically communicates the desired lighting value DLV to error detector 37. In one embodiment, error detector 37 is an adder as shown and transceiver 35 electrically communicates desired light value DLV to a positive input of the adder. In a second embodiment, error detector 37 is an operation amplifier with a dual input, and transceiver 35 electrically communicates desired light value DLV to a non-inverting input of the operational amplifier.

Error detector 37 compares the desired light value DLV and the sensed light value SLV, and electrically communicates a correction light value CLV to controller 31 where the correction light value CLV is indicative of a differential between the desired light value DLV and the sensed light value SLV. Controller 31 employs conventional circuitry for determining whether a change in the output power levels of LEDs 21 is required in view of the correction light value CLV, and to communicate a LED control signal CS2 to power circuit 32 where LED control signal CS2 is indicative of any change that needs to take place in the output power levels of LEDs 21. Power circuit 32 employs a power integrated circuit ("PWR IC") 33 to conventionally receive an electrical power PWR required to drive the circuits described herein, and to supply a direct current $I_{LED}$ to LEDs 21 based on the required optical power levels of LEDs 21 as indicated by LED control signal CS2.

Additionally, in one embodiment of the present invention, a user of LED system 10 can operate remote controller 40 to transmit a control signal CS3 to antenna 34 where control signal CS3 is indicative of a software program to be stored in a controller 31, wherein controller 31 is a programmable controller. Antenna 34 electrically communicates control signal CS3 to transceiver 35, which selectively converts control signal CS3 into a control signal CS4 indicative of the desired software program to be stored in the controller, and electrically communicates the desired software program to controller 31 to be stored. When the stored program is to be implemented, controller 31 electrically communicates a control signal CS5 to transceiver 35 where control signal CS5 is indicative of a desired emission of light from LEDs 21 in view of the software program stored in memory. Transceiver 35 selectively converts control signal CS5 into the desired light value DLV. In one embodiment, control signal CS1 overrides control signal CS5 whereby transceiver 35 converts control signal CS1 into desired lighting value DLV whenever transceiver 35 receives a concurrent communication of controls signals CS1 and CS5 from antenna 34 and controller 31, respectively. In a second embodiment, control signal CS5 overrides control signal CS1 whereby transceiver 35 converts control signal CS5 into desired lighting value DLV whenever transceiver 35 receives a concurrent communication of controls signals CS1 and CS5 from antenna 34 and controller 31, respectively.

In practice, a structural configuration of each component of LED driver assembly 30 is dependent upon the commercial implementations of LED driver assembly. In one embodiment, LED driver assembly 30 is constructed in accordance with (1) U.S. Patent Application Publication US2001/0024112 A1 published Sep. 27, 2001, and entitled "Supply Assembly For A LED Lighting Module", (2) United States Patent Application Publication US2003/0085749 A1 published May 8, 2003, and entitled "Supply Assembly For A LED Lighting Module", (3) U.S. patent application Ser. No. 60/468,538 filed on May 7, 2003, and entitled "Single Driver For Multiple Light Emitting Diodes", (4) U.S. patent application Ser. No. 10/323,445 filed Dec. 19, 2002, and entitled "Supply Assembly For An LED Lighting Module", and/or (5) U.S. patent application Ser. No. 60/468,553 filed May 7, 2003, and entitled "Current Control Method and Circuit for Light Emitting Diodes", all of which are hereby incorporated by reference and assigned to the assignee of this application.

Figure 3:
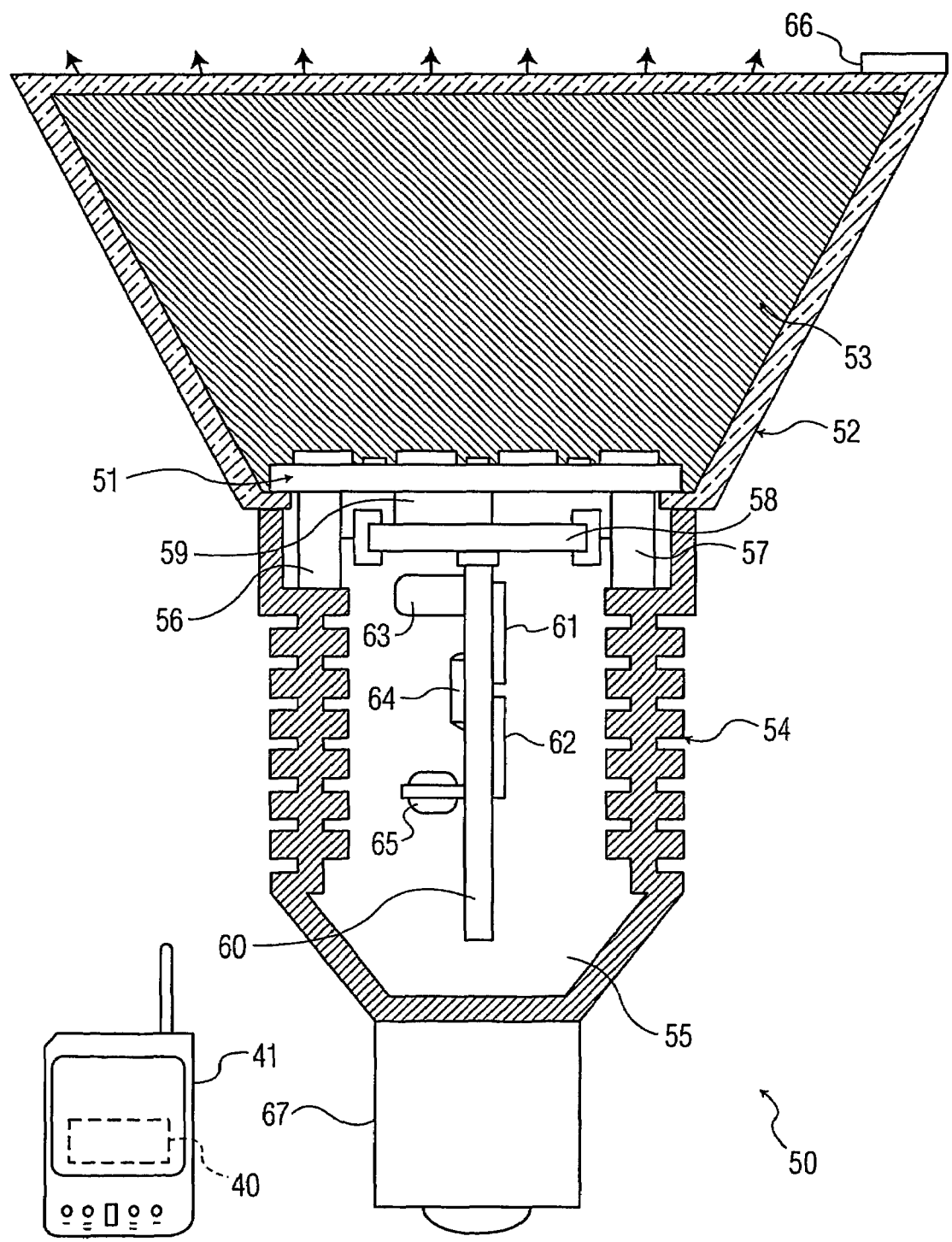
FIG. 3 illustrates a cross-sectional view of one embodiment of a lamp assembly in accordance with one embodiment of the present invention.

FIG. 3 illustrates a lamp assembly 50 and a remote control 41 implementing LED system 10 (FIG. 1). Lamp assembly 50 employs a LED assembly 51 (an implementation of LED assembly 20 shown in FIG. 1), a reflector 52 having an inner surface defining a light reflecting area 53, a heat sink 54 having an inner surface defining a circuit housing area 55, thermal conductors 56 and 57, a mounting board 58, a power circuit 59 (an implementation of power circuit 32 shown in FIG. 1), a circuit board 60, and an antenna 66 (an implementation of antenna 34 shown in FIG. 1). LED assembly 51 is disposed within light reflecting area 53 and in thermal communication with heat sink 54 to dissipate heat away from LED assembly 51.

Mounting board 58, power circuit 59 and circuit board 60 are disposed within circuit housing area 55. Mounting board 58 is attached to heat sink 54 via thermal conductors 56 and 57, which provide thermally conductive paths to draw the heat from the LED assembly 51 to the heat sink 54. Mounting board 58 supports power circuit 59 and circuit board 60 as shown. Electrically mounted on circuit board 60 are a controller 61 (an implementation of controller 30, signal processor 36, and error detector 37 shown in FIG. 1), a transceiver 62 (an implementation of transceiver 35 shown in FIG. 1), and electronic components in the form of a capacitor 63, a resistor 64 and an inductor 65.

Remote control 41 incorporates remote controller 40 (FIG. 1), which may include, but is not limited to, a handheld computer, a lap top, a dedicated computer, or a personal digital assistant (PDA), to transmit a radio frequency signal responsive to input from a user (not shown). The transmitted radio frequency signal will be received by an antenna 66. The user may input a variety of lighting variables associated with the emission of the light by LED assembly 51 including, but not limited to, light intensity levels, light color levels, color temperature levels and time. The user may input programs to modify one or more of these various parameters as a function of time.

In one embodiment, the user programs the remote control 41, using a keypad, with a lighting program to control a variety of lighting variables associated with the emission of the light by LED assembly 51 over a period of time. The program may be transmitted as delayed signals based on the program to the lamp assembly 50 in order to vary the light parameters over time. The program may start immediately upon being input, the program may start at a preprogrammed future time or the program may start periodically at a preprogrammed future times.

In a second embodiment, the user uses a keypad on the remote control 41 to program the remote control 41 with multiple sets of software code. Each set of software code will control at least one of a variety of lighting variables associated with the emission of the light by at least one LED array, wherein the changes in lighting variables will be implemented at specific preprogrammed times. One of the multiple sets of software code may be initiated by a keystroke sequence on a keypad or touchscreen (not labeled) on the remote controller for immediate, future or periodic activation.

In a third embodiment, the user downloads one set of software code from the remote control 41 to controller 31, as control signal CS3 to transceiver 35, which selectively converts control signal CS3 into a control signal CS4 as described above. The downloaded set of software code may be implemented to control the emission of light from lamp assembly 50 immediately upon download, it may be implemented at a future time as programmed or it may be implemented periodically as programmed.

In a fourth embodiment, the user downloads multiple sets of software code from the remote control 41 to controller 31. Any one of the downloaded sets of software code may be implemented to control the emission of light from lamp assembly 50 immediately upon download, or any one of the downloaded sets of software code may be implemented at a future time as programmed or any one of the downloaded sets of software code may be implemented periodically as programmed. Alternately, any one of the downloaded sets of software code may be initiated by a keystroke sequence on a keypad or touchscreen (not labeled) on the remote controller for immediate, future or periodic activation. Such a keystroke sequence on a keypad or touchscreen will transmit a radio frequency signal to be received at the antenna 66 at the lamp assembly 50.

As previously mentioned, antenna 66 receives a radio frequency signal from remote control 41 and electrically communicates the signal to transceiver 62 via a cable (not shown). In one embodiment, the cable is extended through light reflecting area 53 from antenna 66 to circuit board 60. In a second embodiment, the cable extends along an outer surface of reflector 54 and enters circuit housing area 55 through the heat sink 54.

Within light reflecting area 53, reflector 52 contains a light reflecting material LRM, which is, at least partially, optically transparent to the light emitted from the LED assembly 51. The light reflecting material LRM contained in reflector 52 is, in one embodiment, a silicone, such as, for example, a Nye two-part silicone (part numbers OC-97228A-1 and OC-97228B-1). The interface between air and the surface of the light reflecting material LRM (not shown) reflects a portion of the light emitted from the LED assembly 51 back towards the LED assembly 51. The optical power sensors 22 (FIG. 2) of LED assembly 51 detect the optical power reflected at the air interface with light reflecting area 53. The optical power sensors 22 are in electrical communication with the controller 61 via trace lines and/or via in or on mounting board 58 and circuit board 60.

Optical scattering particles may, in one embodiment, be mixed into the light reflecting material LMR to mix the light emitted by the LEDs on LED assembly 51 and to reflect the light back to the optical power sensors on the LED assembly 51.

The interface between the air and the surface of the light reflecting material LRM may be shaped to direct more or less reflected optical power to the LED assembly 51. Alternately, the interface between the air and the surface of the light reflecting material LRM may be shaped to appropriately mix the emission of various colored LEDs reflected back to LED assembly 51. Such mixing will allow the reflected power to replicate the mix of the emission of various colored LEDs at a point outside the lamp assembly 50. Alternately, an additional element, such as, for example, a lens, a filter, or a diffuser may be attached to the front surface of the lamp assembly 50 to affect the shape, direction or color of the light emitted from the lamp assembly 50.

he electrical power required to drive the circuits is delivered by placing a lamp base 67 into a conventional light socket. The electrical connections from the lamp base 67 to power circuit 58 and circuit board 60 are not illustrated but, one skilled in the art, can envision numerous ways to apply electrical power to power circuit 59 and circuit board 60.

The lamp assembly 50 and a remote control 41 implementing LED system 10 (FIG. 1) provide numerous functions. The variables controlled include timing information to control the color and intensity, as well as dimming level. Information about the status of the lamp operation, such as, for example, the status of the operation of LED 21 or the LED assembly 51 may be obtained. Such status information may be used to determine if either is no longer operational and needs repair based on periodic lamp assembly 50 status checks programmed into the remote controller 40 or the controller 31. Information about the ambient light levels may be utilized to cause the lamp to adjust the output level so as to not waste energy or to adapt its color to maintain a preferred ambiance.

Additionally, for safety and security purposes, the lamp may have an alarm mode to be used when an unauthorized person enters the room and is detected by a sensor, which can communicate the intrusion to the lamp directly or via another link. The lamp may then be turned on to allow for a clear video image to be obtained with an installed camera. A light being turned on in the room may also panic the intruder causing the intruder to flee. A pre-programmed "fire" mode may also be used to help firemen see more clearly during a rescue. White light in smoke usually hinders visibility, so the system may be programmed to emit red light to enhance visibility to those in the room.

The illustrated embodiment of lamp assembly 50 is meant to illustrate a structure to provide light reflection within the lamp assembly 50 to optical power sensor(s) to be used as feedback in the operation of a remotely controlled or programmed circuit to control LED(s) to obtain a desired light level and is not intended to be exhaustive of all possibilities or to limit what can be fabricated for the aforementioned purpose. There is therefore a multiplicity of other possible combinations and embodiments. By using what is shown and described herein, a remote control 41 communicates with the lamp assembly 50 to obtain at least one desired light level parameter. Those having ordinary skill in the art will therefore appreciate the benefit of employing an embodiment of lamp assembly 50 in numerous and various devices.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

The invention claimed is:

1. A lamp assembly (50), comprising:
   a reflector (52) defining a light reflecting area (53);
   a heat sink (54) defining a circuit housing area (55) operable to receive a LED driver circuit (30);
   a LED assembly (20) disposed within said light reflecting area (53) and in thermal communication with said heat sink (54) to dissipate heat away from said LED assembly (20), said LED assembly (20) including
      at least one LED (21) operable to emit a light in response to a flow of a LED current ($I_{LED}$) through said at least one LED (21), a portion of the light being reflected within the light reflecting area (53) as reflected light, and
      at least one optical power sensor (22) operable to sense the reflected light; and
   wherein said LED driver circuit (30) is disposed within said circuit housing area (55), said LED driver circuit being in electrical communication with said LED assembly (20) to control the flow of the LED current ($I_{LED}$) through said at least one LED (21) as a function of a sensing of the emission of the light by said at least one optical power sensor (22).

2. The lamp assembly (50) of claim 1, wherein said at least one LED (21) includes a plurality of LED arrays ($LED_R$, $LED_G$, $LED_B$, $LED_A$).

3. The lamp assembly (50) of claim 1, wherein the at least one optical power sensor (22) comprises a plurality of optical power sensors.

4. A lamp assembly (50), comprising:
   a reflector (52) defining a light reflecting area (53);
   a heat sink (54) defining a circuit housing area (55);
   a LED assembly (20) disposed within said light reflecting area (53) and in thermal communication with said heat sink (54) to dissipate heat away from said LED assembly (20), said LED assembly (20) including
      at least one LED (21) operable to emit a light in response to a flow of a LED current ($I_{LED}$) through said at least one LED (21), a portion of the light being reflected within the light reflecting area (53) as reflected light, and
      at least one optical power sensor (22) operable to sense the reflected light; and
   a LED driver circuit (30) disposed within said circuit housing area (55), said LED driver circuit in electrical communication with said LED assembly (20) to control the flow of the LED current ($I_{LED}$) through said at least one LED (21) as a function of a sensing of the emission of the light by said at least one optical power sensor (22), said LED driver circuit (30) including a transceiver (35) operable to receive a communication of at least one lighting variable associated with the emission of the light by said at least one LED (21);
   wherein the flow of the LED current ($I_{LED}$) through said at least one LED (21) is a function of the sensing of the emission of the light by said at least one optical power sensor (22) and a reception of the communication of the at least one lighting variable by said transceiver (37).

5. The lamp assembly (50) of claim 4, further comprising: an antenna (36) operable to transmit the communication of the at least one lighting variable to said transceiver (35).

6. The lamp assembly (50) of claim 4, further comprising:
   a controller (31) in electric communication with said transceiver (35) to communicate a LED control signal (CS5) indicative of the at least one lighting variable to said transceiver (35).

7. The lamp assembly (50) of claim 4, wherein said at least one LED (21) includes a plurality of LED arrays ($LED_R$, $LED_G$, $LED_B$, $LED_A$).

8. The lamp assembly (50) of claim 4, wherein said LED driver circuit (30) further includes:
   an error detector (37) for generating a correction light value (CLV) indicative of a differential between a sensed light value (SLV) and a desired light value (DLV), the sensed light value (SLV) being indicative of the sensing of the reflected light by said at least one optical power sensor (22), the desired light value (DLV) being indicative of the reception of the communication of the at least one lighting variable by said transceiver (35).

9. The lamp assembly (50) of claim 8, wherein said LED driver circuit (30) further includes:
   a controller (31) in electrical communication with said error detector (37) to receive the correction light value (CLV), said controller (31) operable to generate a LED control signal (CS2) as a function of the correction light value (CLV).

10. The lamp assembly (50) of claim 9, wherein said LED driver circuit (30) further includes:
    a power circuit (32) in electrical communication with said controller (31) to receive the LED control signal (CS2), said power circuit (32) operable to direct the flow of the LED current ($I_{LED}$) through said at least one LED (21) as a function of the LED control signal (CS2).

11. A lamp assembly (50), comprising:
    a reflector (52) defining a light reflecting area (53);
    a heat sink (54) defining a circuit housing area (55);
    a LED assembly (20) disposed within said light reflecting area (53) and in thermal communication with said heat sink (54) to dissipate heat away from said LED assembly (20), said LED assembly (20) including
       at least one LED (21) operable to emit a light in response to a flow of a LED current ($I_{LED}$) through said at least one LED (21), and
       at least one optical power sensor (22) operable to sense an emission of the light by said at least one LED (21); and
    a LED driver circuit (30) disposed within said circuit housing area (55), said LED driver circuit in electrical communication with said LED assembly (20) to control the flow of the LED current ($I_{LED}$) through said at least one LED (21) as a function of a sensing of the emission of the light by said at least one optical power sensor (22), said LED driver circuit (30) including a transceiver (35) operable to receive a communication of at least one lighting variable associated with the emission of the light by said at least one LED (21), said LED driver circuit (30) further including an error detector (37) for generating a correction light value (CLV) indicative of a differential between a sensed light value (SLV) and a desired light value (DLV), the sensed light value (SLV) being indicative of the sensing of the emission of the light by said at least one optical power sensor (22), the desired light value (DLV) being indicative of the reception of the communication of the at least one lighting variable by said transceiver (35);
    wherein the flow of the LED current ($I_{LED}$) through said at least one LED (21) is a function of the sensing of the emission of the light by said at least one optical power sensor (22) and a reception of the communication of the at least one lighting variable by said transceiver (37).

12. The lamp assembly (50) of claim 11, wherein said LED driver circuit (30) further includes:

a controller (31) in electrical communication with said error detector (37) to receive the correction light value (CLV), said controller (31) operable to generate a LED control signal (CS2) as a function of the correction light value (CLV).

13. The lamp assembly (50) of claim 12, wherein said LED driver circuit (30) further includes:

a power circuit (32) in electrical communication with said controller (31) to receive the LED control signal (CS2), said power circuit (32) operable to direct the flow of the LED current ($I_{LED}$) through said at least one LED (21) as a function of the LED control signal (CS2).

* * * * *